United States Patent [19]
Lee et al.

[11] Patent Number: 5,367,037
[45] Date of Patent: Nov. 22, 1994

[54] PROCESS FOR PRODUCING ETHYLENE/PROPYLENE/ETHYLIDENE NORBORNENE RUBBERS

[75] Inventors: Kiu H. Lee, South Charleston, W. Va.; Mahmoud R. Rifi, Kendall Park, N.J.; Mark J. Kriss, St. Albans, W. Va.; Han-Tai Liu, Belle Mead, N.J.

[73] Assignee: Union Carbide Chemicals & Plastics Technology Corporation, Danbury, Conn.

[21] Appl. No.: 220,738

[22] Filed: Mar. 31, 1994

Related U.S. Application Data

[63] Continuation of Ser. No. 405,204, Sep. 11, 1989, abandoned.

[51] Int. Cl.$^5$ .............................. C08F 2/34; C08F 4/68
[52] U.S. Cl. ..................... 526/133; 526/129; 526/144; 526/151; 526/153; 526/169.2; 526/282; 526/901; 526/905
[58] Field of Search ............... 526/129, 133, 144, 151, 526/153, 169.2, 901

[56] References Cited

U.S. PATENT DOCUMENTS

| | | | |
|---|---|---|---|
| 4,259,468 | 3/1981 | Kajiura et al. | 526/283 |
| 4,508,842 | 4/1985 | Beran et al. | 526/129 X |
| 4,710,538 | 12/1987 | Jorgensen | 526/901 X |
| 4,722,971 | 2/1988 | Datta et al. | 526/66 X |
| 5,106,927 | 4/1992 | Rifi et al. | 526/901 X |
| 5,187,246 | 2/1993 | Baker et al. | 526/901 X |
| 5,187,247 | 2/1993 | Baker et al. | 526/144 X |

FOREIGN PATENT DOCUMENTS

2105355 3/1983 United Kingdom.

Primary Examiner—Fred Teskin
Attorney, Agent, or Firm—Saul R. Bresch

[57] ABSTRACT

A process for the production of EPDM comprising reacting ethylene, propylene, ethylidene norbornene, and hydrogen, in the gas phase, in a fluidized bed, under polymerization conditions, in the presence of a catalyst system comprising:

(a) the reaction product of a vanadium compound and a electron donor;
(b) at least one modifier having the formula $BX_3$ or $AlR_{(3-a)}X_a$ wherein each R is alkyl or aryl and is alike or different; each X is independently chlorine, bromine, or iodine; and a is 0, 1, or 2, wherein components (a) and (b) are impregnated into an inorganic support;
(c) a halocarbon promoter; and
(d) a hydrocarbyl aluminum cocatalyst with the following proviso:
  (i) the partial pressure of ethylene is in the range of about 25 to about 200 psi;
  (ii) the molar ratio of propylene to ethylene is in the range of about 0.2:1 to about 2:1;
  (iii) the molar ratio of hydrogen to ethylene is in the range of about 0.0001:1 to about 0.01:1; and
  (iv) the amount of ethylidene norbornene is about 1.5 to about 15 percent by weight based on the weight of the fluidized bed.

7 Claims, No Drawings

PROCESS FOR PRODUCING ETHYLENE/PROPYLENE/ETHYLIDENE NORBORNENE RUBBERS

This application is a Continuation of prior U.S. application Ser. No. 07/405,204 filed Sep. 11, 1989, now abandoned.

TECHNICAL FIELD

This invention relates to ethylene/propylene/ethylidene norbornene terpolymer rubbers (EPDM) and a process for its production.

BACKGROUND ART

EPDM is an elastomeric terpolymer used in such applications as hose and tubing, wire and cable, gaskets, and single ply roofing. It is generally formulated with fillers, oils, processing aids, and stabilizing agents, and cured by reacting the terpolymer with sulfur in the presence of accelerators or with a combination of sulfur and an organic peroxide such as dicumyl peroxide.

EPDM is produced commercially via batch solution or suspension processes in which complex and costly solvent recovery, separation, and de-ashing are required. These requirements are energy and labor intensive, which are reflected in high operating and investment costs. In order to reduce these costs, the production of EPDM in a gas phase fluidized bed reactor has been suggested, but this entails the selection of a proper catalyst formulation and operating conditions in order to provide an EPDM, which is equivalent in terms of physical properties to currently available EPDM's.

DISCLOSURE OF THE INVENTION

An object of this invention, therefore, is to provide a gas phase, fluidized bed process whereby an EPDM can be produced, which has physical properties equal or superior to commercially available EPDM's.

According to the present invention, a process has been discovered for the gas phase, fluidized bed production of EPDM, which not only produces an EPDM equivalent to commercially available EPDM's, but produces a structurally different EPDM having excellent physical properties. This process comprises reacting ethylene, propylene, ethylidene norbornene (ENB) and hydrogen in the gas phase, in a fluidized bed, under polymerization conditions, in the presence of a catalyst system comprising:
  (a) the reaction product of a vanadium compound and a electron donor;
  (b) at least one modifier having the formula $BX_3$ or $AlR_{(3-a)}X_a$ wherein each R is alkyl or aryl and is alike or different; each X is independently chlorine, bromine, or iodine; and a is 0, 1, or 2,
  wherein components (a) and (b) are impregnated into an inorganic support;
  (c) a halocarbon promoter; and
  (d) a hydrocarbyl aluminum cocatalyst.

The process of this invention employs the following preferred conditions:
  (i) the partial pressure of ethylene is in the range of about 50 to about 200 psi;
  (ii) the molar ratio of propylene to ethylene is in the range of about 0.2:1 to about 2:1;
  (iii) the molar ratio of hydrogen to ethylene is in the range of about 0.0001:1 to about 0.01:1; and
  (iv) the amount of ENB is about 1.5 to about 15 percent by weight based on the weight of the fluidized bed.

DETAILED DESCRIPTION

The vanadium compound can be any of the group of vanadium compounds well known to be useful in forming the complexes used as catalyst precursors in olefin polymerization processes. Examples are vanadium trihalides, vanadium tetrahalides, and vanadium oxyhalides. The halides are generally chlorides, bromides, or iodides, or mixtures thereof. Of these compounds $VCl_3$, $VCl_4$, and $VOCl_3$ can be mentioned. The vanadium acetylacetonates, such as vanadyl triacetylacetonate, are also useful.

The electron donor used in the catalyst is an organic Lewis base, liquid at temperatures in the range of about 0° C. to about 200° C., in which the vanadium compounds are soluble.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

The modifier has the formula $BX_3$ or $AlR_{(3-a)}X_a$ wherein each R is an alkyl radical having 1 to 14 carbon atoms and is alike or different; each X is chlorine, bromine, or iodine and is alike or different; and a is 0, 1 or 2. While one or more modifiers can be used, two different modifiers are preferred. Preferred modifiers include alkylaluminum mono-and dichlorides wherein each alkyl radical has 1 to 6 carbon atoms, boron trichloride, and trialkylaluminums. A particularly preferred modifier combination is diethylaluminum chloride and tri-n-hexylaluminum. About 0.1 to about 10 moles, and preferably about 0.2 to about 2.5 moles, of modifier(s) are used per mole of electron donor. The molar ratio of modifier to vanadium is in the range of about 1:1 to about 10:1 and is preferably in the range of about 2:1 to about 5:1.

Useful halocarbon promoters have the following formula:

$$R_yCX_{(4-y)}$$

Where
  R=hydrogen or an unsubstituted or halogen substituted alkyl radical having 1 to 6 carbon atoms;

X = a halogen; and
y = 0, 1, or 2.

Preferred promoters include fluoro-, chloro-, and bromo-substituted methane and ethane wherein X is at least 2, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The hydrocarbyl aluminum cocatalyst can be represented by the formula $R_3Al$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms.

Examples of hydrocarbyl aluminum compounds are as follows: triisobutylaluminum, trihexylaluminum, diisobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred cocatalysts are triethylaluminum, triisobutylaluminum, trihexylaluminum, diisobutylaluminum hydride, and dihexylaluminum hydride. The trialkylaluminum compounds can also serve as modifiers.

While silica is the preferred support, other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least about 200 square meters per gram and preferably at least about 250 square meters per gram; and a pore size of at least about 100 Angstroms and preferably at least about 200 Angstroms. Generally, the amount of support used is that which will provide about 0.1 to about 0.6 millimole of vanadium per gram of support and preferably about 0.2 to about 0.5 millimole of vanadium per gram of support. Impregnation of the above mentioned catalyst into a silica support is accomplished by mixing the complex and silica gel in the electron donor solvent followed by solvent removal under reduced pressure.

The modifiers are usually dissolved in an inorganic solvent such as isopentane and impregnated into the support following impregnation of the titanium based complex, after which the catalyst is dried. The cocatalyst is preferably added separately neat or as a solution in an inert solvent, such as isopentane, to the polymerization reaction at the same time as the flow of the ethylene is initiated.

The polymerization is conducted in the gas phase in a fluidized bed made up of particulate EPDM. The fluidized bed reactor can be operated at a temperature in the range of about 0° C. to about 60° C. and is preferably operated in the range of abut 10° C. to about 50° C. A superficial velocity of about 1 to about 4.5 feet per second and preferably about 1.5 to about 3.5 feet per second can also be used in the fluidized bed. The total reactor pressure can be in the range of about 150 to about 450 psia and is preferably in the range of about 250 to about 350 psia. The ethylene partial pressure can be in the range of about 50 psi to about 200 psi and is preferably in the range of about 80 psi to about 150 psi. The gaseous feed streams of ethylene, propylene, and hydrogen are preferably fed to the reactor recycle line while liquid ethylidene norbornene and the cocatalyst solution are preferably fed directly to the fluidized bed reactor to enhance mixing and dispersion. Feeding liquid streams into the reactor recycle line can cause a rapid buildup of a fouling layer resulting in very poor reactor operation. The catalyst is preferably injected into the fluidized bed as a solid or a mineral oil slurry. The EPDM composition can be varied by changing the propylene/ethylene molar ratio in the gas phase and the diene concentration in the fluidized bed. The product is continuously discharged from the reactor as the bed level builds up with polymerization. The production rate is controlled by adjusting the catalyst feed rate.

The molar ratio of propylene to ethylene is in the range of about 0.2:1 to about 1.5:1 and is preferably in the range of about 0.35:1 to about 0.8:1. The propylene/ethylene molar ratio is adjusted to control the level of propylene incorporated into the terpolymer. The molar ratio of hydrogen to ethylene is in the range of about 0.0001:1 to about 0.01:1 and is preferably in the range of about 0.0005:1 to about 0.008:1. The hydrogen/ethylene molar ratio is adjusted to control average molecular weights. The level of ethylidene norbornene in the bed is in the range of about 1.5 to about 15 percent by weight based on the weight of the bed and is preferably in the range of about 2 to about 10 percent by weight.

Several steps can be taken, in addition to temperature control, to prevent agglomeration of the elastomeric polymer. The product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to essentially remove all of the static.

The residence time of the mixture of resin, catalyst, and liquid in the fluidized bed can be in the range of about 1.5 to about 8 hours and is preferably in the range of about 3 to about 6 hours. The final EPDM product contains the following amounts of reacted comonomer: about 50 to about 80 percent by weight ethylene; about 18 to about 50 percent by weight propylene; and about 2 to about 10 percent by weight ethylidene norbornene. The crystallinity, also in weight percent based on the total weight of the EPDM, can be in the range of zero (essentially amorphous) to about 15 percent by weight, and is preferably in the range of 0 to about 10 percent by weight. The Mooney viscosity can be in the range of about 20 to about 150 and is preferably about 30 to about 100. The Mooney viscosity is measured by introducing the EPDM into a vessel with a large rotor, preheating for one minute at 100° C., and then stirring for four minutes at the same temperature. The viscosity is measured at 100° C. in the usual manner.

The EPDM of this invention is a product of the above described process, about 20 to about 50 percent by weight of the total terpolymer chains of the EPDM containing less than about 15 percent by weight of the total moieties based on ENB. Preferably this portion of the terpolymer chains contains less than about 12 percent by weight of ENB moieties. A preferred EPDM comprises terpolymer chains of which about 20 to about 30 percent by weight contain less than about 15, or even 12, percent by weight of the total moieties based on ENB. The EPDM can be further characterized in that when it is sulfur cured, the EPDM partially dissolves when refluxed with xylene, the dissolved portion being in the range of about 20 to about 50 percent by weight based on the total weight of the terpolymer. The high percentage of the dissolved portion of the EPDM of this invention is in marked contrast to commercial EPDM's, which, when sulfur cured and refluxed in xylene, are over 90 percent by weight insoluble. In a preferred EPDM, the dissolved portion is in the range of about 20 to about 30 percent by weight.

The advantages of the gas phase fluidized bed process over solution, suspension or other gas phase processes are: (i) simplicity; (ii) elimination of solvent or diluent; (iii) superior product properties; (iv) high catalyst productivity; (v) elimination of catalyst residue removal step; (vi) EPDM granular products can be directly transferred to either pelleting or bailing after residual monomer gas purging; (vii) process can be operated at lower temperatures while maintaining a reasonable catalyst productivity; and (viii) capability of producing products having a broad range of molecular weights, particularly those of high molecular weight.

The catalyst is similar to the catalyst described in U.S. Pat. No. 4,508,842. A typical fluidized bed reactor is described in U.S. Pat. No. 4,482,687. Both patents are incorporated by reference herein.

EXAMPLES 1 AND 2

The catalyst precursor was prepared by impregnating vanadium trichloride into silica that was dehydrated at 600° C. to remove water and most of the surface silanols. The impregnation was accomplished by mixing the dehydrated silica into the precursor solution, which was prepared by dissolving vanadium trichloride in tetrahydrofuran at 70° to 80° C. and drying most of the tetrahydrofuran off under the nitrogen atmosphere.

The precursor was then modified with diethyl aluminum chloride (DEAC) in isopentane solution to provide a DEAC/V molar ratio of about 4.5. The modification step was carried out by slurrying the precursor in isopentane solution and drying under nitrogen atmosphere to a free flowing finished catalyst.

The polymerization was conducted in a continuous gas phase fluidized bed reactor. The fluidized bed was made up of EPDM particles. The gaseous feed streams of ethylene, propylene, and hydrogen were fed to the reactor cycle line. Liquid ethylidene norbornene (ENB) and cocatalyst solutions were fed directly into the fluidized bed reactor to enhance mixing and dispersion. The cocatalyst was triisobutylaluminum (TiBA). The catalyst was introduced into the fluidized bed as solid particles using purified nitrogen as a carrier gas. A continuous purge flow of nitrogen was maintained in the product discharge line. A static probe was installed in the reactor to monitor static level.

Reaction conditions, catalyst analysis, and EPDM properties are set forth in Table I.

TABLE I

| Reaction Conditions | Example 1 | Example 2 |
|---|---|---|
| Temperature (°C.) | 40 | 30 |
| Total reactor pressure (psia) | 315 | 315 |
| ethylene (partial pressure) (psi) | 123 | 132 |
| ENB (weight % in bed) | 6.3 | 7.8 |
| $C_3/C_2$ (molar ratio) | 0.37 | 0.48 |
| $H_2/C_2$ (molar ratio) | 0.002 | 0.0006 |
| modifier | DEAC | DEAC |
| cocatalyst | TiBA | TiBA |
| promoter | chloroform | chloroform |
| cocatalyst concentration (ppm) | 300 | 325 |
| promoter/cocatalyst (molar ratio) | 0.8 | 0.8 |
| superficial velocity (feet per second) | 2.0 | 2.0 |
| reactor bed diameter (inches) | 13.25 | 13.25 |
| bed height (feet) | 5 | 5 |
| bed weight (pounds) | 80 | 65 |
| Catalyst Analysis (weight percent) | | |
| vanadium | 1.15 | 1.15 |
| aluminum | 3.04 | 3.04 |
| chloride | 6.0 | 6.0 |
| THF | 6.5 | 6.5 |
| silica | 83.3 | 83.3 |
| | 99.99 | 99.99 |
| EPDM Properties (uncured) | | |
| $C_3$ (weight percent) | 30 | 36 |
| ENB (weight percent) | 4.9 | 2.4 |
| catalyst ash (weight percent) | 0.28 | 0.32 |
| residual vanadium (ppm) | 41 | 50 |
| Mooney viscosity | 110 | 94 |
| crystallinity (wt %) | 11.0 | 2.4 |
| tensile modulus (psi) | 1120 | 775 |
| tensile strength (psi) | 1470 | 1020 |
| elongation (%) | 1650 | 830 |

EXAMPLE 3

When the EPDM prepared by subject process was cured, it contained an appreciable amount of polymer that could be extracted with hot xylene. The extracted fraction was found by nuclear magnetic resonance to contain very little incorporated ethylidene norbornene. This portion of the EPDM did not undergo curing, but acts as a plasticizer for the balance of the EPDM, which does undergo curing, and significantly enhances the mechanical properties of the EPDM. It can be seen that the EPDM in product form displays better toughness (tensile strength), elongation, and resilience (compression set) than commercial EPDM products of comparable composition.

It is also found that EPDM products made with EPDM produced by subject process require much less energy to process. Thus, in compounding the EPDM produced by subject process with about 20 to about 30 percent by weight fillers, the EPDM can be easily processed at about 130° C. whereas it is necessary to use a temperature of about 170° C. in order to achieve proper mixing of analogous commercial EPDM products.

A comparison of three different EPDM's (A, B and C) made with subject process and two commercial EPDM's, Royalene 539 (D) and Royalene 552 (E) (Royalene is a trademark of Uniroyal) follows in Table II. Mechanical properties before and after curing are shown. The after cure properties are shown in parentheses.

The following formulation was cured at 160° C. for 20 minutes:

| Components | Parts by Weight |
|---|---|
| EPDM | 150 |
| zinc oxide | 7.5 |
| stearic acid | 1.5 |
| tetramethylthiurammonosulfide (TMTM) | 2.25 |
| mercaptobenzothiazole (MBT) | 0.75 |
| sulfur | 2.25 |

TABLE II

| | A | B | C | D | E |
|---|---|---|---|---|---|
| Mooney viscosity | 74 | 48 | 45 | 110 | 83 |
| ENB (wt. %) | 5.6 | 3.2 | 4.7 | 4.1 | 4.6 |
| $C_3$ (wt. %) | 33.8 | 25.2 | 30.5 | 21 | 24 |
| crystallinity (wt %) | 8.4 | 16.4 | 8.3 | 11 | 13 |
| tensile modulus (psi) | 740 | 2000 | 1450 | 1480 | 1200 |
| | (1300) | (2600) | (2000) | (1630) | (1300) |
| tensile modulus, 100% (psi) | 160 | 260 | 200 | 300 | 270 |
| | (310) | (415) | (350) | (320) | (400) |
| tensile strength (psi) | 750 | 950 | 670 | 900 | 850 |
| | (1150) | (2870) | (1950) | (1370) | (1100) |
| elongation (%) | 1850 | 1850 | 1900 | 850 | 1215 |
| | (570) | (980) | (1100) | (470) | (430) |

EXAMPLE 4

Curing takes place at a certain temperature for a certain length of time. This time and temperature are the conditions of the cure cycle. The properties of formulated and cured EPDM depend on the nature and the concentration of the components in the EPDM formulation and on the cure cycle.

An EPDM prepared by subject process (A) and Royalene 539 (B) was formulated and cured as follows:

| Formulation: | | (parts by weight) |
|---|---|---|
| 1. | EPDM | 200 |
| | Mooney viscosity = 110 | |
| | crystallinity (wt %) = 11 | |
| 2. | zinc oxide | 10 |
| 3. | stearic acid | 2 |
| 4. | talc | 60 |
| 5. | dicumyl peroxide | 5.4 |
| 6. | sulfur | 0.6 |

Preparation:

Components 1 to 4 were mixed in a Brabender or Banbury mixer at 120° C. to 130° C. When the mixture was well fluxed, as indicated by the lack of any unmixed talc, the peroxide and sulfur was added, and mixing was continued for 2 to 5 minutes. It was observed that, during the preparation, the temperature of EPDM A rises to about 150° C.; however, during the preparation of EPDM B, the temperature rises to about 170° C. Above 170° C., scorching can result. The product was discharged, cured at 180° C. for 20 minutes, and evaluated. The properties are set forth in Table III.

TABLE III

| Properties: | A | B |
|---|---|---|
| 1. tensile modulus (psi) | 2760 | 1900 |
| 2. tensile strength (psi) | 1750 | 1200 |
| 3. elongation (%) | 450 | 250 |
| 4. compression set (%) | 31 | 49 |

EXAMPLE 5

Formulation:

| | parts by weight |
|---|---|
| 1. subject EPDM | 150 |
|    Mooney viscosity = 74 | |
|    Crystallinity (wt %) = 8.5 | |
| 2. carbon black | 75 |
| 3. oil | 23 |
| 4. zinc oxide | 7.4 |
| 5. stearic acid | 1.5 |
| 6. TMTM | 2.5 |
| 7. MBT | 0.75 |
| 8. sulfur | 2.3 |

Preparation:

Components 1 to 7 were mixed in a Brabender mixing head at 130° C. for 20 to 30 minutes. At this time, the temperature rose to 150° C. The product was discharged, flattened in a press, reintroduced into the mixing head, and fluxed at 130° C. The sulfur was added and fluxing was continued for 2 to 3 minutes. The product was then discharged, compression molded at 160° C. for 20 minutes, and evaluated. The properties are set forth in Table IV.

TABLE IV

| Properties: | |
|---|---|
| tensile modulus (psi) | 2500 |
| tensile modulus, 100% (psi) | 600 |
| tensile modulus, 300% (psi) | 2000 |
| tensile strength (psi) | 3600 |
| elongation (%) | 550 |
| Shore Hardness (D-Scale) | 80 |
| compression set (%) | 18 |

EXAMPLE 6

Formulation:

| | | parts by weight |
|---|---|---|
| 1. EPDM containing 4.5 weight % ENB | | 150 |
| 2. zinc oxide | | 7.5 |
| 3. stearic acid | | 1.5 |
| 4. MBT | accelerators | 2.25 |
| 5. TMTM | | |
| 6. sulfur | | 2.2 |

The components were mixed in a Brabender mixing head and the resulting mixture was compression molded and cured at 160° C. for 20 minutes. A portion of the resulting film (11.7 parts by weight) was cut into small pieces (0.5 by 0.5 inch) and placed into a round bottom flask equipped with a mechanical stirrer and a condenser. Xylene, about 500 milliliters, was introduced into the flask which was then heated to a temperature that allows the xylene to reflux. The EPDM in refluxing xylene was stirred for 24 hours, cooled to room temperature, and filtered. The xylene filtrate was concentrated by distillation under vacuum and about 5 parts by weight of a rubbery polymeric substance (about 40 weight percent of the initial EPDM) was isolated. Analysis of this product by nuclear magnetic resonance revealed that it contains less than 0.5 percent by weight ENB based on the total weight of the initial EPDM. Analysis of the filtered EPDM, i.e., the insoluble EPDM, by nuclear magnetic resonance is difficult because of its insolubility in suitable solvents.

When the above experiment was repeated using Royalene 539 EPDM, the xylene solubles were less than 10 percent by weight instead of 40 percent by weight for subject EPDM.

It was concluded that about 40 percent by weight of the polymer chains of the initial subject EPDM contained less than 0.5 percent by weight ENB based on the total weight of the initial EPDM and, therefore, did not undergo sulfur curing and thus could be extracted with xylene, and that about 60 percent by weight of the polymer chains of the initial subject EPDM contained more than 4 percent by weight ENB, underwent sulfur curing, and became insoluble in xylene.

Notes to Tables:
1. The weight percent of ENB in the bed is based on the total bed weight.
2. The parts per million (ppm) of cocatalyst concentration is based on the total bed weight.
3. The superficial velocity is the velocity of the mixture of gases.
4. Weight percent of $C_3$, ENB incorporated into the EPDM, and catalyst ash and ppm of residual vanadium are based on the weight of the EPDM.
5. Mooney viscosity is described above.
6. Crystallinity (weight %) is the weight of crystalline EPDM based on the total weight of the EPDM. It is determined using a duPont Differential Scanning Calorimeter.
7. ENB (weight %) is the weight of the ethylidene norbornene incorporated into the EPDM based on the weight of the EPDM.
8. Tensile modulus (psi) is determined under ASTM 412, Method D.
9. Tensile modulus, 100% (psi) is determined under ASTM 412, Method D.
10. Tensile strength (psi) is determined under ASTM 412, Method D.
11. Elongation (%) is determined under ASTM D-638.
12. Compression set (%) is determined under ASTM 395 at a 25 percent strain at 25° C. for 24 hours. It is the percentage by which a standard test EPDM piece fails to return to its original thickness after being subjected to a standard compression load for a fixed period of time. The lower the percentage, the more resilient the sample.
13. Tensile modulus, 300% (psi) is determined under ASTM 412, Method D.
14. Shore Hardness (D-Scale) is determined under ASTM D-2240.

We claim:
1. A process for the production of an EPDM wherein about 20 to about 50 percent by weight of the terpolymer chains contain less than about 15 percent by weight of the total moieties based on ethylidene norbornene comprising reacting ethylene, propylene, ethylidene norbornene, and hydrogen, in the gas phase, in a fluidized bed, under polymerization conditions, in the presence of a catalyst system comprising:
   (a) the reaction product of a vanadium compound and an electron donor, which is an organic Lewis base in which the vanadium compound is soluble;
   (b) at least one modifier having the formula $BX_3$ or $AlR_{(3-a)}X_a$ wherein each R is independently alkyl or aryl having 1 to 14 carbon atoms; each X is independently chlorine, bromine, or iodine; and a is 0, 1, or 2,
   wherein components (a) and (b) are impregnated into an inorganic support;
   (c) a halocarbon promoter; and
   (d) a hydrocarbyl aluminum cocatalyst with the following provisos;
      (i) the partial pressure of ethylene is in the range of about 80 to about 150 psi;
      (ii) the molar ratio of propylene to ethylene is in the range of about 0.35:1 to about 0.8:1;
      (iii) the molar ratio of hydrogen to ethylene is in the range of about 0.0005:1 to about 0.008:1; and
      (iv) the amount of ethylidene norbornene is about 2 to about 10 percent by weight based on the weight of the fluidized bed.

2. The process defined in claim 1 wherein the electron donor is tetrahydrofuran; the modifier is diethylaluminum chloride; and the promoter has the formula:

$$R_yCX_{(4-y)}$$

wherein
   R=hydrogen or an unsubstituted or halogen substituted alkyl radical having 1 to 6 carbon atoms;
   X=a halogen; and
   y=0, 1, or 2.

3. The process defined in claim 2 wherein the promoter is chloroform, methylene chloride, or 1,1,1-trichloroethane.

4. The process defined in claim 1 wherein about 20 to about 30 percent by weight of the terpolymer chains contain less than about 15 percent by weight of the total moieties based on ethylidene norbornene.

5. The process defined in claim 1 wherein the EPDM, when sulfur cured, partially dissolves when refluxed with xylene, the dissolved portion being in the range of about 20 to about 50 percent by weight based on the total weight of the terpolymer.

6. The process defined in claim 1 wherein the EPDM is cured.

7. The process defined in claim 1 wherein the EPDM contains about 50 to about 80 percent by weight ethylene moieties; about 18 to about 50 percent by weight propylene moieties; and about 2 to about 10 percent by weight ethylidene norbornene moieties.

* * * * *